United States Patent [19]
Andersen et al.

[11] 3,753,475
[45] Aug. 21, 1973

[54] PASSENGER SAFETY RESTRAINT DEVICE INCLUDING BUMPER MOUNTED SWITCH AND ASSOCIATED CIRCUITRY

[76] Inventors: Poul H. Andersen, 2448 N. Wilson, Royal Oak, Mich. 48073; Frank R. Povilaitus, 3620 Finch Rd.; Robert S. Himes, 4146 Gatesford Circle Rd., both of Troy, Mich. 48084

[22] Filed: Nov. 15, 1971

[21] Appl. No.: 198,541

[52] U.S. Cl.............. 180/91, 200/16 D, 200/61.44
[51] Int. Cl..................... B60r 21/00, H01h 3/16
[58] Field of Search ............. 200/16 R, 16 B, 16 C, 200/16 D, 16 E, 61.44, 61.45 R, 61.52, 61.53; 180/91

[56] References Cited
UNITED STATES PATENTS

| 3,547,467 | 12/1970 | Pociask | 180/91 X |
| 3,178,533 | 4/1965 | Lory et al. | 200/16 D |
| 3,224,447 | 12/1965 | Becker et al. | 200/16 B X |
| 3,479,476 | 11/1969 | Swaim | 200/61.45 R |
| 3,567,874 | 3/1971 | Strobel | 200/16 D |
| 3,443,658 | 5/1969 | Culp | 200/61.44 X |
| 3,696,222 | 10/1972 | Langan et al. | 200/16 B |

Primary Examiner—J. R. Scott
Attorney—Gary L. Newtson

[57] ABSTRACT

Sensing device for sensing the velocity of an automotive vehicle when the latter collides with another object, the device having a plurality of contacts adapted to be electrically interconnected at different times depending upon the velocity of the vehicle at the moment of impact.

3 Claims, 6 Drawing Figures

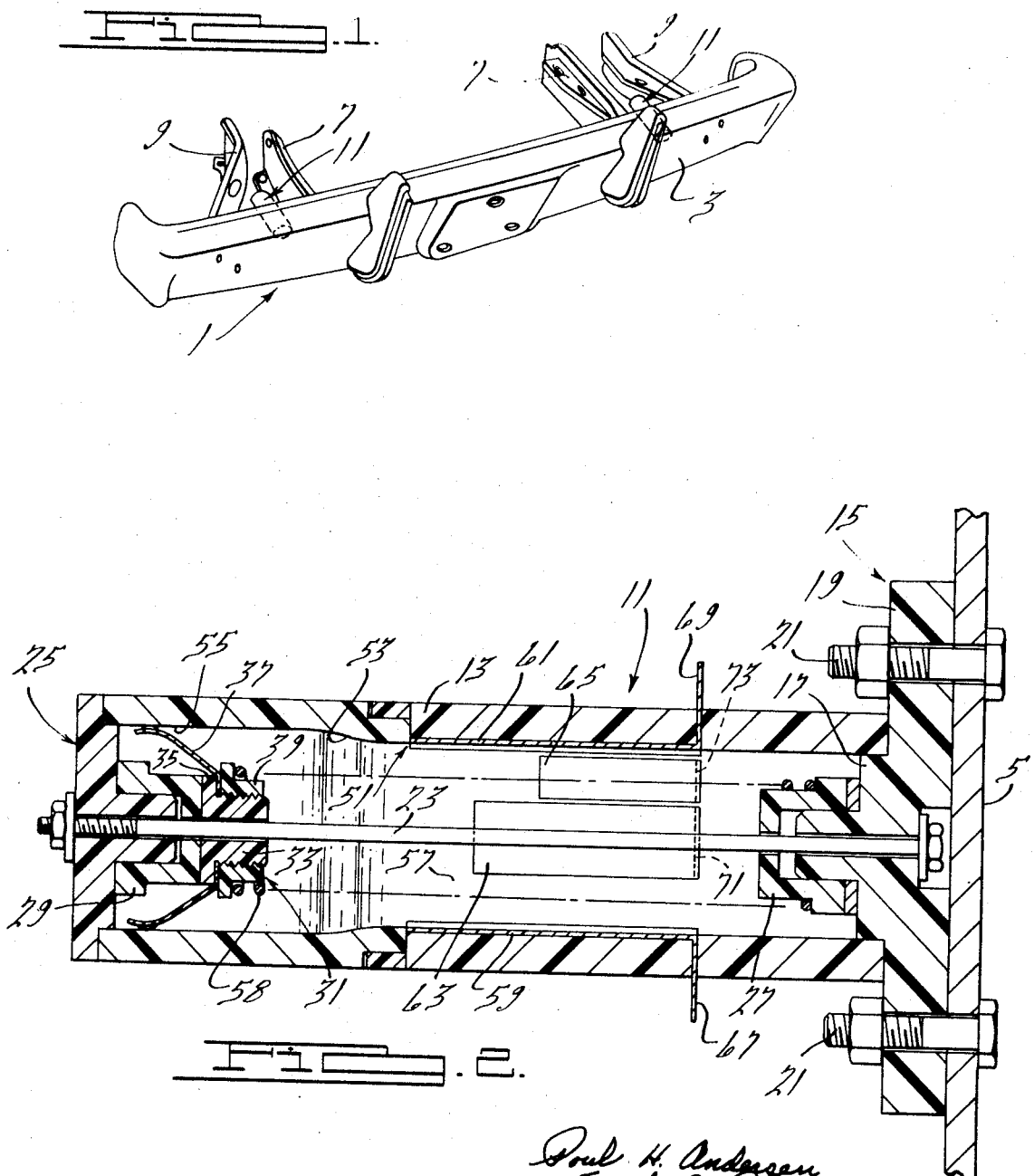

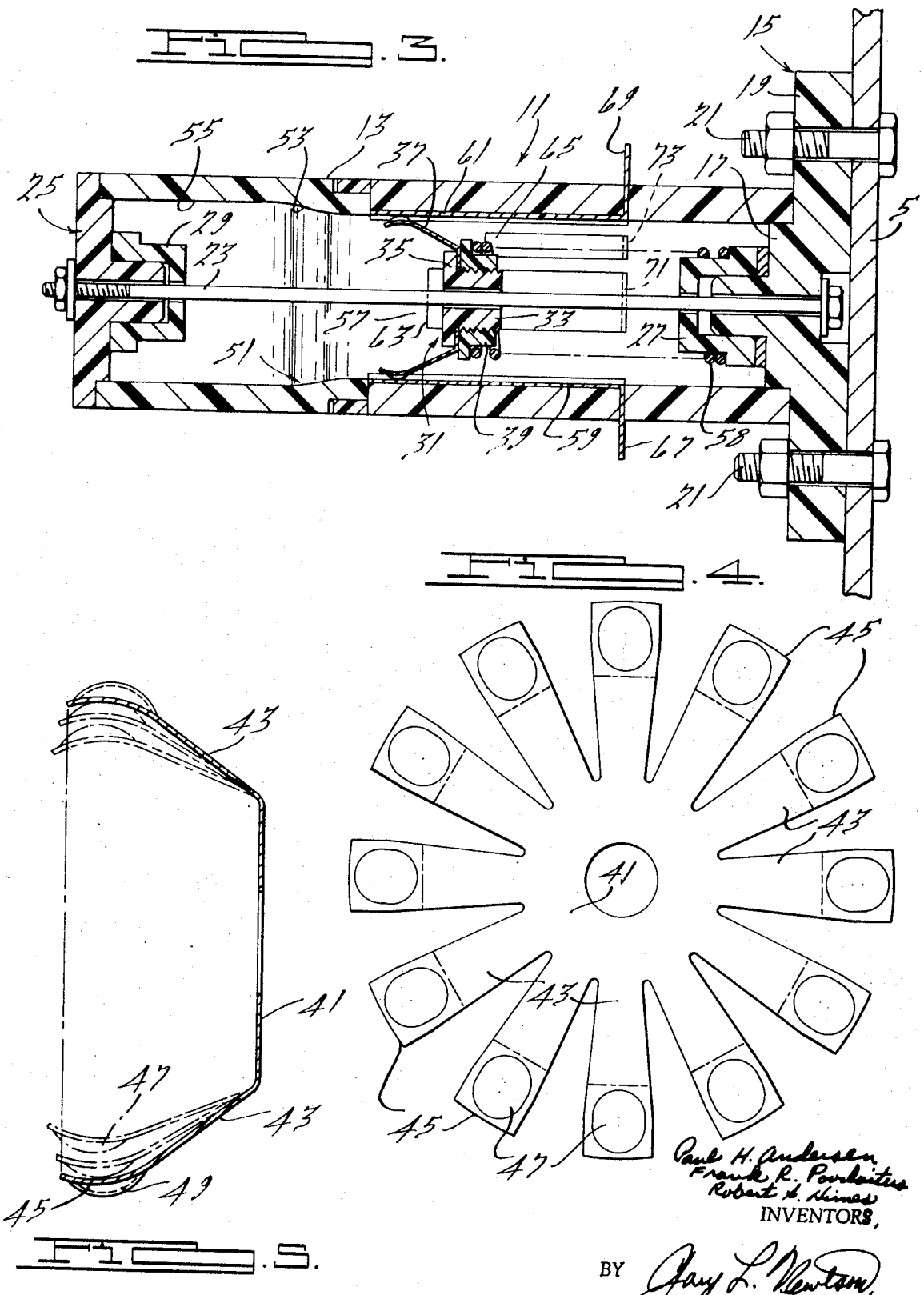

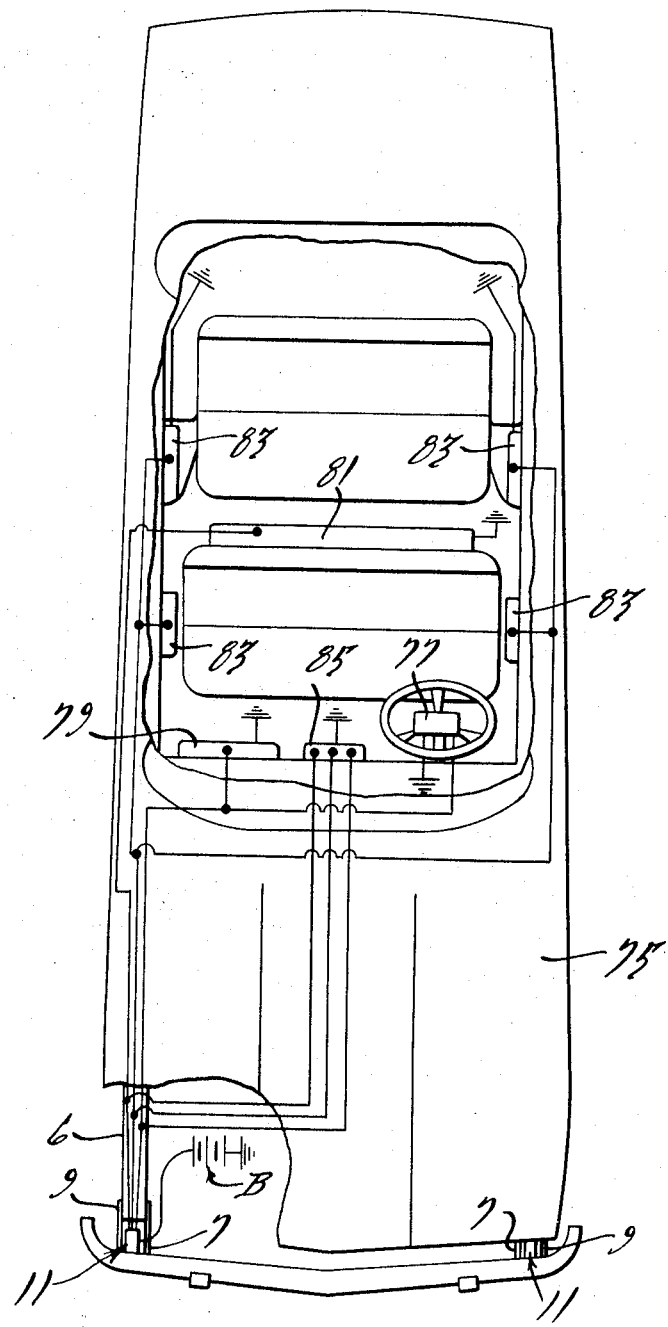

PASSENGER SAFETY RESTRAINT DEVICE INCLUDING BUMPER MOUNTED SWITCH AND ASSOCIATED CIRCUITRY

BACKGROUND OF THE INVENTION

This invention relates to a sensing device, and more particularly to a sensing device for actuating safety apparatus for providing vehicle occupant protection during a collision of the vehicle with another object.

There are many known types of safety devices which are normally passive during normal operation of a vehicle, but which are actuated during a collision to restrain movement of the occupants. One well-known type is the inflatable bag type which includes a bag cosmetically hidden during normal operation of the vehicle. During a collision the bag is inflated by one or more of several methods, such as using gas from a compressed gas storage vessel or gas generated by propellant, or a combination of the two methods.

It is obvious that the device which senses the impact should not be such that it would actuate the safety system during normal vehicle operation. For example, it may not be desirable to activate the safety system when the vehicle wheels drop in chuck holes in the road or perhaps hit a low curb, or hit other objects which are not disabling, even though the instantaneous deceleration of the vehicle may be higher than the deceleration occurring when the vehicle collides with a stationary vehicle, for example. In this regard the duration of the deceleration is very important for the chuck hole induced deceleration is very short while the duration of deceleration during collisions may be relatively long.

Moreover, a collision at one speed may not require the actuation of the same number of safety devices or the same inflation rate of one device as a collision at a higher speed, i.e., it may be necessary or desirable to activate either more inflatable restraints or one restraint at a faster rate when a collision at a high speed occurs than when a lower speed collision occurs.

BRIEF SUMMARY OF THE INVENTION

Briefly, this invention relates to a passenger restraint system having a plurality of devices or a device having a plurality of deployment means adapted to be selectively activated as a function of the velocity of the vehicle at the moment of impact.

One of the primary objects of this invention is to provide a sensing device for sensing certain collisions which may cause injury to the passengers.

Another object of this invention is to provide a sensing device such as described which is adapted to sense the speed range of the vehicle during impact so that various deployment mechanisms may be activated depending upon such speed.

A further object of this invention is to provide a sensing device of the class described which is relatively insensitive to normal road defects and obstructions.

Still another object of this invention is to provide a sensor such as described which may be mounted on the vehicle bumper.

Another object of this invention is to provide a sensor of the type described which is economical in construction and efficient in operation.

Other objects and advantages of this invention will be made apparent as the description progresses.

BRIEF DESCRIPTION OF THE DRAWINGS

In the drawings, in which one of various possible embodiments is illustrated,

FIG. 1 is a perspective view of the front bumper of an automotive vehicle with two sensors constructed in accordance with this invention mounted thereon;

FIG. 2 is an enlarged longitudinal section through one of the sensors, with the parts thereof in one position;

FIG. 3 is a view similar to the FIG. 2 with the movable parts of the sensor in another position;

FIG. 4 is a plan view of one of the components of the sensor as it appears prior to being formed into its final shape;

FIG. 5 is a section taken through the part shown in FIG. 4 after the part has been formed into its final shape; and FIG. 6 is a plan view of the use of a sensor in an automotive vehicle application employing inflatable restraints.

Like parts are shown by corresponding reference characters throughout the several views of the drawings.

DESCRIPTION OF THE PREFERRED EMBODIMENT

Referring now to the drawings, an automotive vehicle front bumper is illustrated at 1. The bumper includes a face bar 3 supported by a reinforcing member 5 extending along the face bar on the rearward side thereof. The reinforcing member 5 is joined to the vehicle frame 6 (see FIG. 6) by inner and outer support brackets 7 and 9, respectively.

As shown, impact velocity sensors 11 are attached to the reinforcing member 5 at two points, one being located between each set of support brackets. Obviously the sensors could be located in other positions, such as inboard of the supports. Each sensor 11 includes a cylindrical housing or chamber 13 having an end head 15 at the forward end thereof. The end head 15 has a central portion 17 located within cylindrical housing 13 and a marginal portion 19 through which fasteners 21 are adapted to extend for securing the sensor 11 to the reinforcing member 5.

A guide rod 23 extends from the rearward end 25 of housing 13 to the end head 15. A resilient energy absorbing stop 27 is secured to the central portion 17 of end head 15 and a spacer 29 is connected to the end 25.

Slideably mounted on rod 23 is a mass or actuator 31. Mass 31 includes an externally threaded sliding member 33 having an actuator shoulder or flange 35 thereon. An electrically conductive spider 37 having a centrally located aperture which surrounds rod 23 is clamped against flange 35 by a nut 39 threaded onto member 33.

Spider 37, which is shown in FIG. 4 as it appears when initially stamped from a sheet of metal, includes a base portion 41 and a plurality of radially extending fingers 43. These fingers are curved at their outer ends 45 and have spoon-shaped dimples 47 formed thereon, the dimples being concave on the inside of the fingers so as to form bulges or sliding contact portions 49. The fingers 43 are inclined toward the wall of cylindrical member 13.

The inside wall 51 of housing 13 is circular in cross section and includes a tapered portion 53 which separates the inside wall into a first portion 55 having a constant cross sectional area and a second portion 57 having a cross sectional area smaller than the first area. The tapered portion 53 provides a smooth transition between the first and second portions 55 and 57. Mass 31 is biased to the left as viewed in FIG. 2 by a coil spring 58 surrounding rod 23.

Contacts 59, 61, 63 and 65 are flush with the second portion 57 and extend along a portion thereof. Each contact 59, 61, 63 and 65 has a tab or foot 67, 69, 71 and 73, respectively, extending radially outwardly through the housing.

The rearward end of contacts 59 and 61 are located at the same point axially along the wall portion 57 while the rearward end of contact 63 is spaced axially forward of the rearward ends of contacts 59 and 61. The rearward end of contact 65 is spaced axially forwardly of the rearward end of contact 63. The spacing of the rearward ends of these contacts is predetermined so that contacts 59 and 61 are electrically connected when the fingers 43 of spider 37 have moved one predetermined distance, contacts 59 and 63 are electrically connected when the fingers have moved a second predetermined distance, and contacts 59 and 65 are electrically connected when the fingers have moved a third predetermined distance.

It will be seen that if an impact of sufficient duration occurs while the vehicle bumper is moving at one velocity, the mass will move against the bias of spring 58 a predetermined distance. If the vehicle is moving at a higher velocity when impact occurs the mass will move a greater distance. Accordingly, the rearward ends of the contacts 61, 63 and 65 may be spaced apart so that electrical connection between such contacts and contact 59 will be made sequentially at a high speed with no connection being made between contacts 59, 61, 63 and 65 below a first speed, no connection being made between contacts 59, 63 and 65 at below a second speed, higher than the first, and no connection being made between 59 and 65 below a third speed higher than the second speed.

The tab 67 is adapted to be connected to an electrical energy source such as a battery. Tabs 69, 71 and 73 may be respectively connected to different actuatable restraint devices, such as inflatable bag devices or as described hereinafter, may be respectively connected to three different means for actuating one device. These devices may be located and be of such construction that actuation of only one such device is considered necessary or advantageous when collisions occur at one velocity and above but below another higher velocity. However, if the velocity of the vehicle is above a second level but below a third level, it may be desirable to actuate both the device connected to tab 71 as well as the device connected to tab 69. Similarly, at speeds above the third level it may be considered advantageous to actuate all of the devices connected to tabs 69, 71 and 73. For examplary purposes only, this type of arrangement is shown in FIG. 6 wherein an automotive vehicle is shown at 75. A plurality of inflatable restraint devices is located in the passenger compartment. For example, an inflatable bag restraint device is shown at 77 mounted on the steering column. A front passenger inflatable device 79 is mounted on the instrument panel. A rear passenger inflatable device 81 is shown as being mounted on the back of the front seat. Also shown in FIG. 6 is a plurality of door mounted inflatable devices 83. For examplary purposes only, it may be assumed that it is desirable to inflate only restraint devices 77 and 79 during collisions occurring at or below a certain velocity. If the collision occurs at speeds above the second velocity higher than the first, it may be desirable to actuate devices 81 in addition to devices 77 and 79. Similarly, at impacts occurring above a third velocity, higher than the first two, it may be desirable to actuate all of the devices 77, 79, 81 and 83. A battery or other electrical power source is illustrated at B in FIG. 6.

Rather than connecting the various contacts 61, 63 and 65 to different inflatable restraint devices, such contacts could all be connected to the means for inflating or actuating one such device. This is shown at unit 85 in FIG. 6. The means for inflating the device may be one or more stored gas containers or gas generating devices or a combination of both, for example. The sensor 3 would sense whether an impact is a low velocity or high velocity impact and actuate one or more of the inflating means for the device depending on such velocity. The higher the velocity of the vehicle during impact the faster the device should be inflated and accordingly, the sensor may actuate all of the inflating means during a high velocity impact and only actuate one of the means during a low velocity impact.

Operation of the apparatus is as follows:

During normal driving conditions the spring 58 biases the mass 31 against the spacer 29. Normal road induced vibrations and braking of the vehicle are insufficient to move the mass 31 any significant distance toward the contacts 59–65. The friction between the contacting portions 49 and the wall 51 may also inhibit movement of the mass 31 toward the contacts. Spring 58 exerts a substantially constant biasing force against the mass 31.

If the vehicle is moving at a predetermined velocity such as 15 mph, for example, and is rammed into a fixed barrier, the mass 31 will move toward the right as viewed in FIG. 2. This movement will be opposed by the spring 58 and the friction between the wall 51 and contacting portions 49. The spring rate and the amount of frictional resistance may be predetermined so that the mass will move to the right under these impact conditions enough so that one or two contacting portions 49 engage contacts 59 and 61. It will be noted that the tapered portion 53 causes the finger 43 of spider 37 to bend inwardly and in so doing increasing the frictional resistance between the wall and the portions 49. By varying the amount of taper 53 and the length of the fingers 43 the frictional resistance can be controlled to insure that the mass 31 moves only the distance desired when an impact occurs at a specified vehicle speed.

In the present example, if the impact occurs while the vehicle is moving at 15 mph, the mass may move to a position wherein the contacting portions 49 of the fingers engage contacts 59 and 61, thereby electrically connecting the latter. If the FIG. 6 system is used, the inflatable devices 77 and 79 would be actuated. Also, one of the inflating means of device 85 may be actuated.

If the vehicle is moving at higher velocity, such as 20 mph, for example, at the moment of impact, the mass 31 will move farther to the right towards end head 15 until the finger 43 engages contact 63, thereby electrically interconnecting contacts 59, 61 and 63. Devices 77, 79 and 81 in FIG. 6 would then be actuated. Also, a second inflating means for device 85 may be actuated. If the vehicle is traveling at 30 mph, for example, the fingers may electrically connect all of the contacts 59, 61, 63 and 65, thereby actuating devices 77, 79, 81 and 83. Also, all of the inflating means of device 85 may be actuated. If the mass engages stop 27 with sufficient force the stop will collapse slightly to absorb some of the energy of the moving mass.

The fingers 43, by forming an acute angle with the wall forwardly of the point of engagement with the wall, have less frictional resistance upon forward movement than upon rearward movement. This assures a prolonged electrical contact with the various contacts 61, 63 and 65 once such contact has been established.

It will be seen that this sequential connection of contact 59 with the contacts 61–65 provides a means for sequentially actuating deployable restraint devices and also permits actuation of only the device or devices which are considered necessary for the speed of the vehicle at the moment of impact.

In view of the foregoing it will be seen that the several objects and other advantages of this invention are achieved.

Although only one embodiment of the invention has been disclosed and described, it is apparent that other embodiments and modifications of the invention are possible.

We claim:

1. Apparatus for providing passenger protection in an automotive vehicle during a collision of the latter with another object comprising a plurality of actuatable means adapted to be selectively actuated for activating restraint means for automotive vehicle passengers, means for actuating said actuatable means including an electrical power source, sensing means for sensing the velocity of the vehicle during the collision, said sensing means comprising a housing means and mass means in said housing means, means mounting said mass means for movement relative to said vehicle along an axis, said mass means moving a first predetermined distance from a first position to a second position upon impact of the vehicle against a solid barrier at one velocity, and moving a second predetermined distance, beyond said first predetermined distance, upon impact of the vehicle against a solid barrier at a second velocity, greater than said first velocity, said housing means and mass means including contact means for electrically connecting said power source to one of said actuatable means upon movement of said mass means said first predetermined distance from said first position, said contact means electrically connecting said power source to another one of said actuatable means when said mass means has moved said second predetermined distance beyond said first predetermined distance, said housing means comprising an elongated hollow member closed at its opposite ends, the inside wall of said hollow member being generally circular in cross section, said contact means comprising a spider forming part of said mass means, said spider having a base and a plurality of fingers extending from said base toward an inside wall of said housing means, said inside wall having a friction portion thereof tapered inwardly between the portion thereof adjacent said spider when said mass means is in said first position and the portion thereof adjacent said spider when said mass means is in said second position, said contact means further comprising at least three contacts on said inside wall, all of said contacts being located forwardly of said friction portion and at least two of said three contacts being spaced apart in an axial direction relative to the movement of said mass means, the fingers of said spider frictionally engaging said tapered friction portion and being flexed inwardly thereby when said mass means moves through said first predetermined distance, said fingers connecting one of said two contacts with the third contact upon movement of said mass means said first predetermined distance and connecting the other of said two contacts with said third contact upon movement of said mass means said second predetermined distance beyond said first predetermined distance.

2. Apparatus as set forth in claim 1 including a resilient energy absorbing stop for stopping forward movement of said mass means, said fingers having bulges on the ends thereof engaging said inside wall.

3. Apparatus for providing passenger protection in an automotive vehicle during a collision of the latter with another object comprising a plurality of actuatable means adapted to be selectively actuated for activating restraint means for automotive vehicle passengers, means for actuating said actuatable means including an electrical power source, sensing means for sensing the velocity of the vehicle during the collision, said sensing means comprising a housing means and mass means in said housing means, means mounting said mass means for movement relative to said vehicle along an axis, said mass means moving a first predetermined distance from a first position to a second position upon impact of the vehicle against a solid barrier at one velocity, and moving a second predetermined distance, beyond said first predetermined distance, upon impact of the vehicle against a solid barrier at a second velocity, greater than said first velocity, said housing means and mass means including contact means for electrically connecting said power source to one of said actuatable means upon movement of said mass means said first predetermined distance from said first position, said contact means electrically connecting said power source to another one of said actuatable means when said mass means has moved said second predetermined distance beyond said first predetermined distance, said contact means comprising an electrically conductive spider having a plurality of elongated fingers thereon, said fingers frictionally engaging the wall of said housing means as said mass means moves along said axis, a plurality of contact strips on the inside of said wall of said housing adapted to be engaged at different times by said fingers as said mass moves along said axis, and said wall of said housing tapering inwardly along a portion thereof causing said fingers to be frictionally engaged with said tapered portion and flexed inwardly as they pass thereby, said tapered portion being located rearwardly of said contact strips causing said fingers to pass frictionally over said tapered friction portion before engaging said contact strips.

* * * * *